US008305260B2

(12) United States Patent
Shijo et al.

(10) Patent No.: US 8,305,260 B2
(45) Date of Patent: Nov. 6, 2012

(54) ANTENNA DEVICE AND RADAR APPARATUS

(75) Inventors: Tetsu Shijo, Tokyo (JP); Takayoshi Ito, Kanagawa-ken (JP); Shuichi Obayashi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 451 days.

(21) Appl. No.: 12/709,914

(22) Filed: Feb. 22, 2010

(65) Prior Publication Data
US 2010/0225528 A1    Sep. 9, 2010

(30) Foreign Application Priority Data
Mar. 9, 2009    (JP) ................................. 2009-055537

(51) Int. Cl.
*G01S 7/28*    (2006.01)
(52) U.S. Cl. .................. 342/175; 342/371; 343/844
(58) Field of Classification Search ................. 342/175, 342/195, 361, 368, 371–381; 343/844, 853
See application file for complete search history.

(56) References Cited

U.S. PATENT DOCUMENTS

| 3,611,401 | A | * | 10/1971 | Connolly ...................... 342/377 |
| 3,803,624 | A | * | 4/1974 | Kinsey .......................... 342/380 |
| 4,028,710 | A | * | 6/1977 | Evans ........................... 342/374 |
| 4,228,436 | A | * | 10/1980 | DuFort .......................... 342/371 |
| 4,254,417 | A | * | 3/1981 | Speiser ......................... 342/368 |
| 5,017,927 | A | * | 5/1991 | Agrawal et al. ............... 342/371 |
| 5,216,428 | A | * | 6/1993 | DuFort .......................... 342/368 |
| 6,018,316 | A | * | 1/2000 | Rudish et al. ................. 342/361 |
| 7,098,848 | B2 | * | 8/2006 | Ksienski et al. .............. 342/372 |
| 7,327,313 | B2 | * | 2/2008 | Hemmi et al. ................. 342/368 |
| 2006/0164284 | A1 | * | 7/2006 | Pauplis et al. ................... 342/16 |

FOREIGN PATENT DOCUMENTS

| JP | 2000-124727 |  | 4/2000 |
| JP | 2010119045 | A * | 5/2010 |
| JP | 2010212895 | A * | 9/2010 |

OTHER PUBLICATIONS

Abbaspour-Tamijani, A.; Sarabandi, K.; , "Planar implementation of the partially overlapped subarrays for millimeterwave beam steerable antenna applications," Microwave Symposium Digest, 2002 IEEE MTT-S International , vol. 1, No., pp. 53-56, 2002.*
Sharma, S.K.; Shafai, L.; , "Performance of a microstrip planar array antenna at millimeter wave frequencies using a series-parallel feed network," Antennas and Propagation Society International Symposium, 2001. IEEE , vol. 3, No., pp. 594-597 vol. 3, 2001.*
U.S. Appl. No. 12/617,320, filed Nov. 12, 2009, Shijo, et al.
U.S. Appl. No. 12/718,302, filed Mar. 5, 2010, Shijo, et al.

(Continued)

*Primary Examiner* — John B Sotomayor
(74) *Attorney, Agent, or Firm* — Oblon, Spivak, McClelland, Maier & Neustadt, L.L.P.

(57) ABSTRACT

An antenna device includes subarray antennas including antenna elements, feeding lines and feeding interfaces. At least one of the feeding lines includes a phase shifter which shifts phases of the signals feeding to corresponding antenna elements. The feeding lines feed signals to the antenna elements. Each feeding interface is connected to each of subarray antennas. The subarray antennas are arranged parallel to each other with an interval on a plane to be symmetrical about a central axis. The interval is less or equal than a free-space wavelength. The central axis is along with the center of two adjacent subarray antennas arranged at middle of the subarray antennas when the number of the subarray antennas is even. Moreover, the central axis is along with one subarray antenna arranged at the middle of the subarray antennas when the number of the subarray antennas is odd.

19 Claims, 10 Drawing Sheets

OTHER PUBLICATIONS

Hideo Iizuka, et al., "Antennas for Automotive Millimeter-wave Radar Systems", Institute of Electronics, Information, and Communications Engineers, Proceedings of the IEICE General Conference, SB-1-7, May 2001, pp. 743-744.

Yusuke Okajima, et al., "A Slotted Post-wall Waveguide Array with Inter-digital Structure for 45-deg Linear and Dual Polorization", The Institute of Electronics, Information and Communication Engineers, Technical Report of IEICE, RCS-103(459), Nov. 2003, pp. 21-26.

* cited by examiner

US 8,305,260 B2

ANTENNA DEVICE AND RADAR APPARATUS

CROSS REFERENCE TO RELATED APPLICATIONS

This application is based upon and claims the benefit of priority from the Japanese Patent Application No. 2009-055537, filed on Mar. 9, 2009, the entire contents of which are incorporated herein by reference.

BACKGROUND OF THE INVENTION

1. Field of the Invention

The present invention relates to an antenna device and a radar apparatus.

2. Description of the Related Art

In monopulse radar systems, an array antenna forms a beam to transmit a signal. Then, the array antenna receives an echo signal which is corresponded to the signal in order to measure a target angle.

The array antenna includes several subarray antennas as disclosed in "Antenna Engineering Handbook", Ohmsha, pp. 339-pp. 445. In millimeter wave band, one side of each subarray antenna is connected to a feeding interface such as a waveguide or a line such as a triplate line and a microstrip line in order to feed a signal. These feeding methods are disclosed by H. Iizuka, K. Sakakibara, T. Watanabe, K. Sato, and K. Nishikawa, "Antennas for Automotive Millimeter-wave Rader Systems", IEICE, SB-1-7, pp. 743-pp. 744, 2001, and in JP-A 2000-124727(KOKAI).

A waveguide feeding method is popular for the antenna in automotive radar systems using the millimeter wave. In the case that the width of the feeding interface which is the waveguide is larger than interval of the subarray antenna an extra space is required between adjacent subarray antennas when all feeding interfaces are formed at the same side of all subarray antennas. As a result, an aperture area of the array antenna gets large.

On the other hand, the space between the adjacent subarray antennas should be narrow in order to achieve a wide coverage angle in the automotive radar systems.

One of the waveguide feeding methods is disclosed by Y. Okajima, S. Park, J. Hirokawa, and M. Ando, "A Slotted Post-wall Waveguide Array with Inter-digital Structure for 45-deg Linear and Dual Polarization", IEICE Technical Report, AP2003-149, RCS2003-155, pp. 21-26, 2003. In this reference, the subarray antennas in the array antennas are arranged in an inter-digital structure.

In the array antenna with the inter-digital structure, the feeding interfaces are formed at a different side of the subarray antennas alternately. Therefore, since the adjacent subarray antennas are arranged with no space, it can achieve a small aperture area of the array antenna.

However, the array antenna with the asymmetrical inter-digital structure for a scan plane causes an asymmetrical phase difference of a signal beam of each subarray antenna because of manufacturing tolerance. As a result, measurement accuracy of the target angle degrades in the monopulse radar systems using the array antenna with the inter-digital structure.

SUMMARY OF THE INVENTION

According to one aspect of the invention, an antenna device includes:
subarray antennas arranged parallel to each other with an interval on a plane, each subarray antenna including antenna elements and feeding lines, the feeding lines feeding signals to the antenna elements; and
feeding interfaces, each being connected to each of the subarray antennas,
wherein
at least one of the feeding lines includes a phase shifter which shifts phases of the signals feeding to corresponding antenna elements,
the interval of the subarray antennas is less or equal than a free-space wavelength,
the subarray antennas are symmetrically arranged about a central axis on the plane,
the central axis being along with the center of two adjacent subarray antennas arranged at middle of the subarray antennas when the number of the subarray antennas is even, and being along with one subarray antenna arranged at the middle of the subarray antennas when the number of the subarray antennas is odd.

According to another aspect of the invention, an antenna device includes:
subarray antennas, each subarray antenna including antenna elements and feeding lines, being arranged along an alignment of the antenna elements parallel to each other with an interval on a plane, the feeding lines feeding signals to the antenna elements; and
feeding interfaces, each being connected to each of the subarray antennas, being divided into two groups with the central axis, each being located at a furthest end of the subarray antenna from the feeding interface of the adjacent subarray antenna in each groups,
wherein
at least one of the feeding lines includes a phase shifter which shifts phases of the signals feeding to corresponding antenna elements,
the interval of the subarray antennas is less or equal than a free-space wavelength,
the subarray antennas are symmetrically arranged about a central axis on the plane,
the central axis being along with the center of two adjacent subarray antennas arranged at middle of the subarray antennas when the number of the subarray antennas is even, and being along with one subarray antenna arranged at the middle of the subarray antennas when the number of the subarray antennas is odd.

According to other aspect of the invention, a radar apparatus includes:
the antenna device of claim 1, which receives a first signal;
an RF chip amplifying the first signal and down-converting a frequency of the first signal to a lower frequency to obtain a second signal;
an A/D converter converting the second signal to a digital signal;
a DBF circuit measuring a target angle based on the digital signal.

DETAILED DESCRIPTION OF THE INVENTION

The embodiment will be explained with reference to the accompanying drawings.

Figure 1:
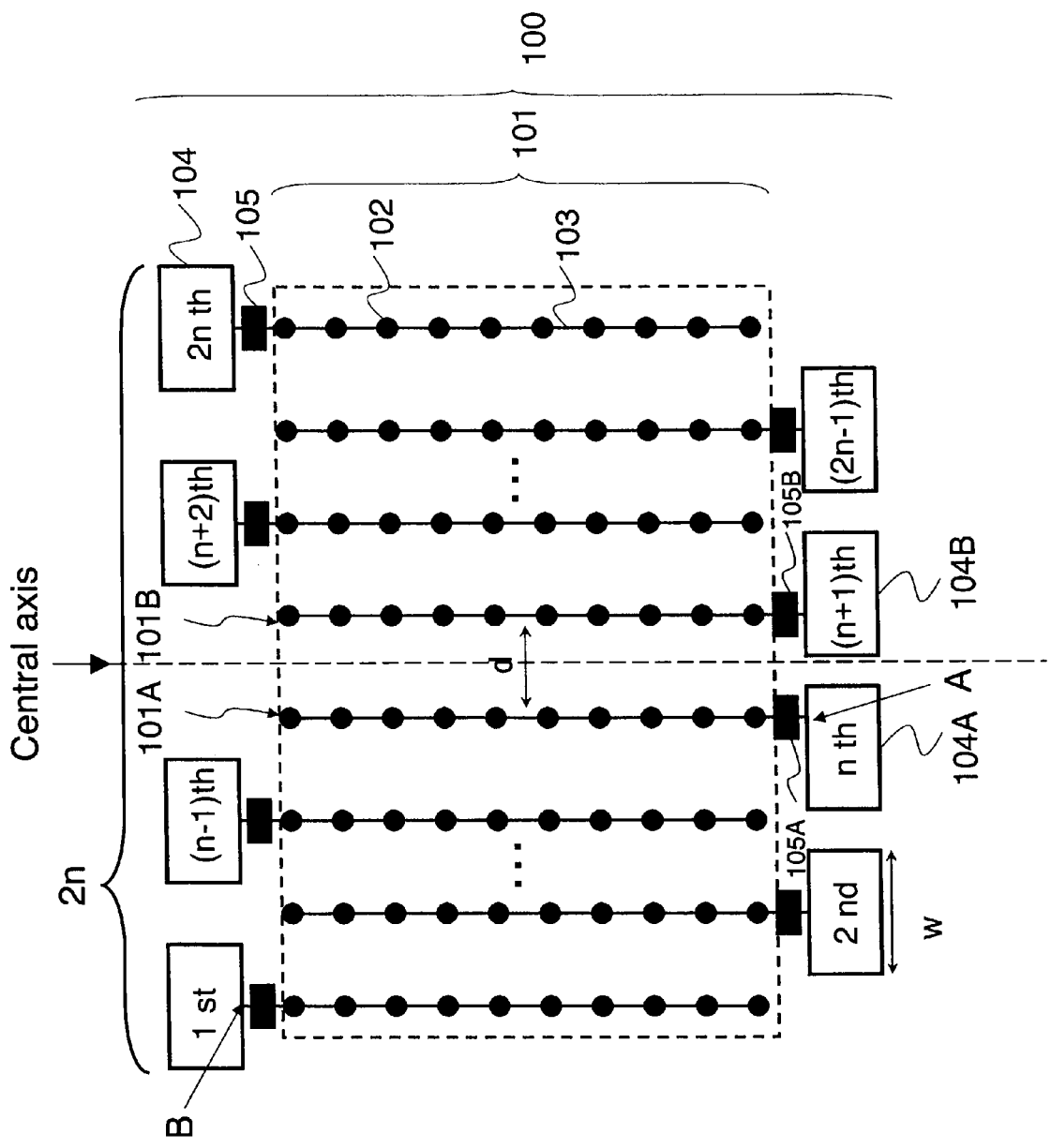
FIG. 1 is a top view of an antenna device.

As shown in FIG. 1, an antenna device 100 includes subarray antennas 101, feeding interfaces 104, and phase shifters 105. The subarray antennas 101 are set parallel to each other on a same plane. The subarray antennas 101 provide an array antenna. One side of each subarray antenna 101 is connected to the feeding interface 104 through the phase shifter 105 in order to feed a signal. Each subarray antenna 101 includes antenna elements 102 and feeding lines 103. The antenna element 102 may be any one of a slot, horn, and patch antenna elements. The feeding line 103 feeds the signal to the antenna element 102. The feeding line 103 may be a waveguide, a triplate line, a microstrip line, a dielectric waveguide, and a post-wall waveguide.

The phase shifter 105 is inserted in the feeding line 103 of between the feeding interface 104 and the antenna element 102. The phase shifter 105 may be a waveguide, a microstrip line, a triplate line, a dielectric waveguide, and a post-wall waveguide. Each phase shifter 105 shifts phases of signals by varying a length of the feeding line 103. In the case of that the phase shifter 105 is a waveguide, a dielectric waveguide, and a post-wall waveguide, the phase shifter 105 may shift the phases of the signals current in the feeding line 103 by varying a width of the feeding line 103.

The phase shifter 105 shifts phases of the signals input from the feeding interface 104 in order to control a beam pattern of antenna. We consider an example case that a phase of a signal from the feeding interface 104A and a phase of a signal from the feeding interface 104B are different by 180 degree. The phase shifter 105A shifts the phase to be θA degree and the phase shifter 105B shifts the phase to be θB degree, where θA+θB=±180+360×n degree (n is an integer). As a result, the phases of signals radiated from the subarray antennas 101A, 101B are co-phase. Therefore, the antenna device 100 directs a beam at front.

In this embodiment, the feeding line 103 and the phase shifter 105 are provided separately. The feeding line 103 may includes the phase shifter 105 by adjusting the length and width of the feeding line 103. The phase shifter 105 may be a line of which width is different from the feeding line 103.

The distance of the between adjacent subarray antennas 101 (hereinafter, "subarray interval") is shown as "d" in the FIG. 1. The subarray interval "d" is following the expression (1) in order to reduce a grating lobe level. In the expression (1), a free-space wavelength of operating frequency is "λ" and a maximum coverage angle is "θm".

$$\frac{d}{\lambda} < \frac{1}{(1+\sin|\theta_m|)} \quad (1)$$

According to the expression (1), the subarray interval "d" is smaller than the free-space wavelength of operating frequency. For example, the subarray interval "d" should be smaller than 0.6λ to achieve the coverage angle of 40 degrees. The number of the subarray antennas 101 is "8" in FIG. 1. However, it is not limited. For example, it may be "15" in other case.

Also, the subarray antennas 101 are arranged symmetrically with a central axis which is a center line of the antenna device 100. Specifically, the antenna elements 102 and the feeding lines 103 except the phase shifters 105 are arranged symmetrically with the central axis as shown by doted-line in FIG. 1. Because each phase shifter 105 has different shape depending on sifted amount of the phase.

In FIG. 1, since the number of the subarray antennas 101 is even (shown as "2n"), the central axis is located in the middle of two adjacent subarray antennas 101 which are n th and (n+1) th. The subarray antennas 101 are arranged in the inter-digital structure. Therefore, the feeding interfaces 104 are located at different side of the subarray antennas 101 alternately, except for the n th and (n+1) th feeding interfaces 104. The n th and (n+1) th feeding interfaces 104, which are the closest to the central axis, are located at the same side of the n th and (n+1) th subarray antennas 101. The n th and (n+1) th feeding interfaces 104 are shifted away from each other to avoid giving interference.

Each amount of the shift should be more than a value which is following as the expression (2). "w" is a width of the feeding interfaces 104.

$$\frac{w-d}{2} \quad (2)$$

In FIG. 1, the n th feeding interface 104 is shifted to leftward to be away from the central axis. Also, the (n+1) th feeding interface 104 is shifted to rightward. The n th and (n+1) th connection points "A" between the feeding interfaces 104 and the subarray antennas 101 are not in the middle of the width of the feeding interfaces 104 compared with the other connection points "B".

Figure 2:
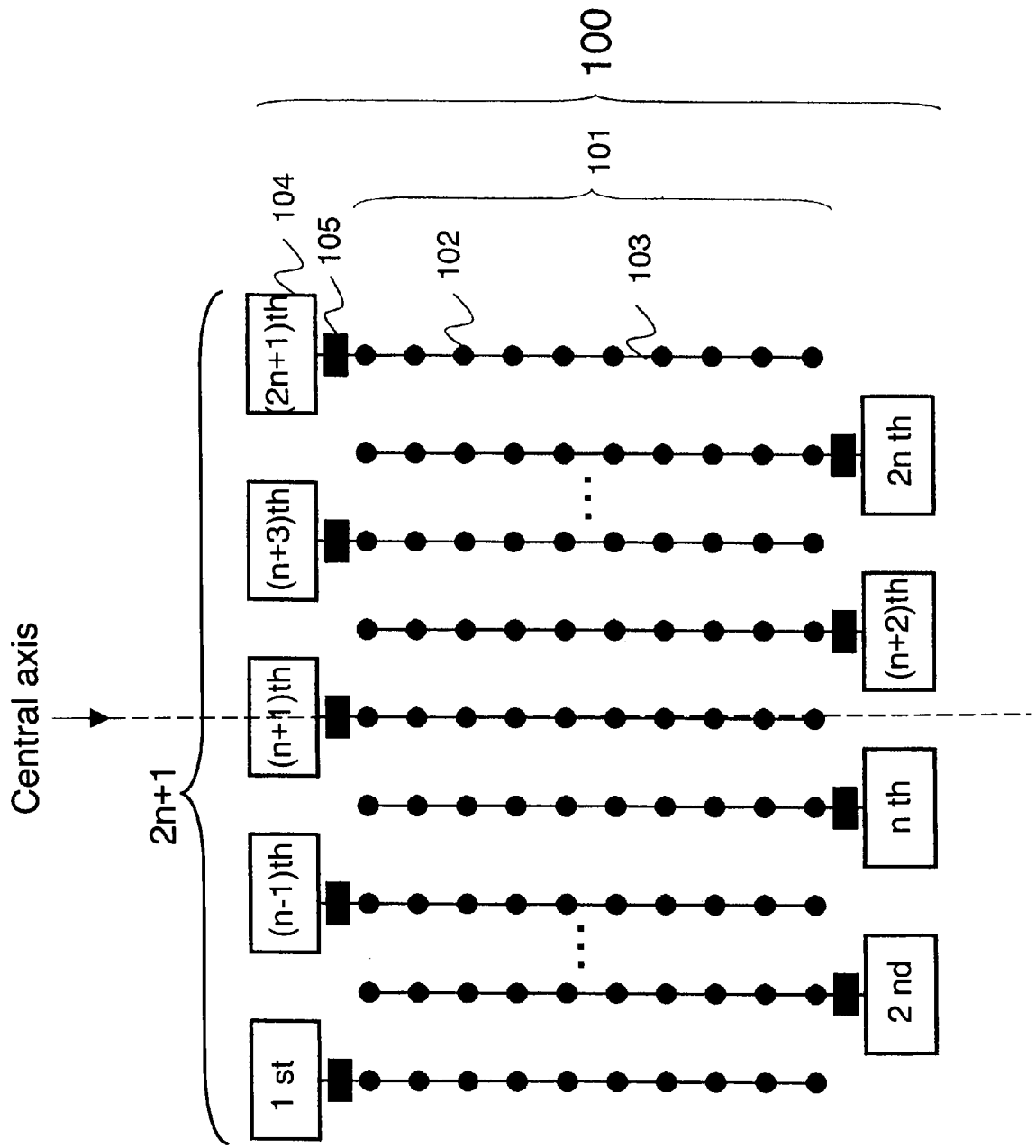
FIG. 2 is a top view of an antenna device.

FIG. 2 shows the antenna device 100 which the number of the subarray antennas is odd (shown as "2n+1"). The central axis is located at the (n+1) th subarray antenna 101. The subarray antennas 101 are arranged in the inter-digital structure. Therefore, the n th feeding interface 104 is located at one side of the n th subarray antenna 101. The (n+1) th feeding interface 104 is located at the opposite side of the (n+1) th subarray antenna 101.

Figure 3:
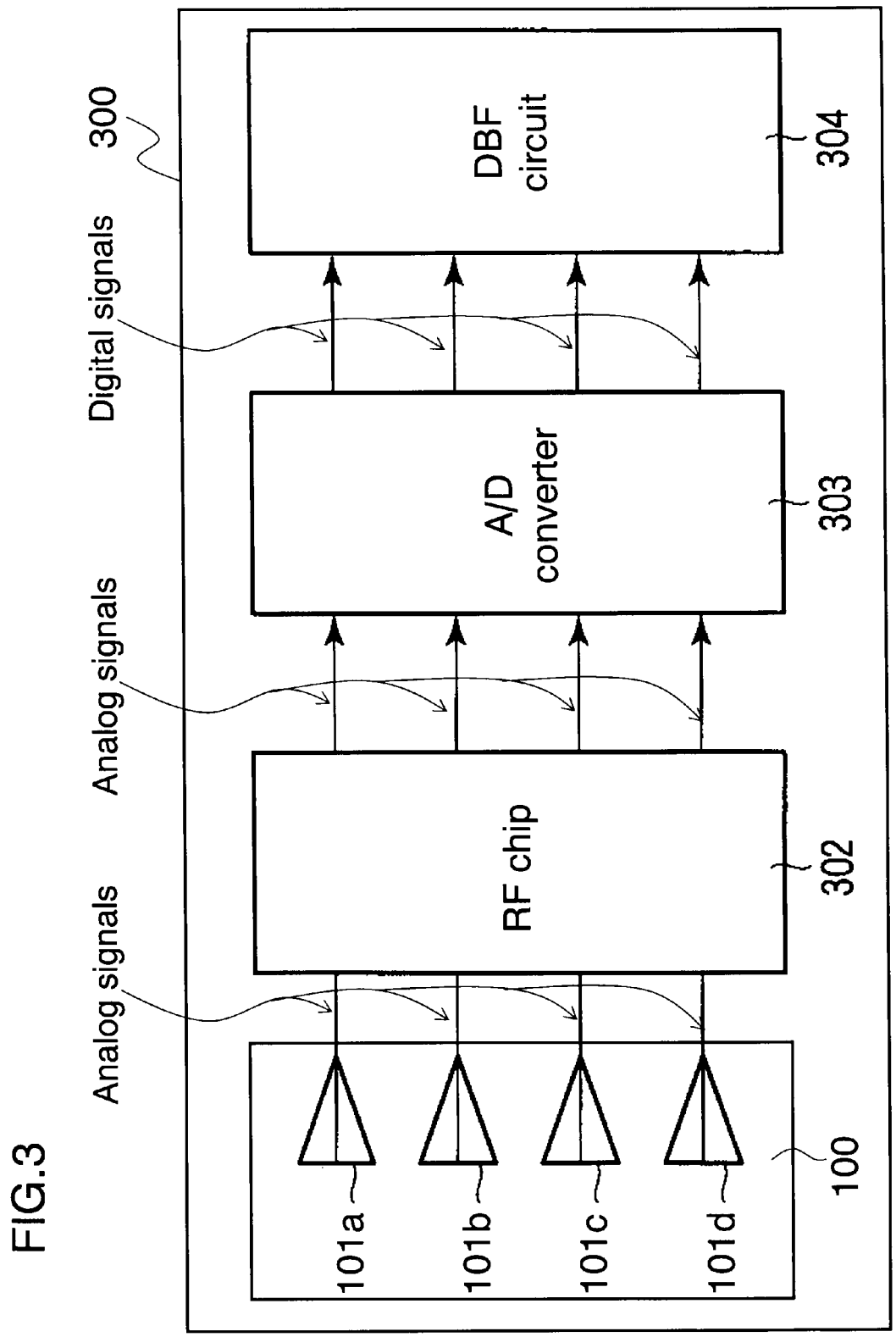
FIG. 3 is a block diagram showing a radar apparatus.

Hereinafter, we will explain a monopulse radar system. As shown in FIG. 3, the monopulse radar system 300 includes the antenna device 100, an RF chip 302, a frequency and A/D (Analog/Digital) converter 303, and a DBF (Digital Beam Forming) circuit 304. The antenna device 100 includes the subarray antennas 101a, 101b, 101c, 101d. The number of the subarray antennas 101 is not limited to four. Each subarray antenna 101 receives an analog signal. The antenna device 100 outputs the analog signals from the subarray antennas 101a, 101b, 101c, 101d to the RF chip 302. The RF chip 302 amplifies the analog signals. Also, the RF chip 302 down-converts a frequency of each analog signal to a lower frequency. Then, the RF chip 302 outputs the analog signals to the A/D converter 303. The A/D converter 303 converts the analog signals to digital signals. Then, the A/D converter 303 outputs the digital signals to the DBF circuit 304. The DBF circuit 304 measures the target angle by using the digital signals. First, the DBF circuit 304 combines all digital signals in same phase to obtain a sum signal. Next, the DBF circuit 304 combines two digital signals due to the subarray antennas 101a and 101b in same phase to obtain a first combine signal. Similarly, the DBF circuit 304 combines two digital signals due to the subarray antennas 101c and 101d in same phase to obtain a second combine signal. Then, the DBF circuit 304 combines the first and second combine signals in inverse phase to obtain a differential signal. At last, the DBF circuit 304 measures the target angle by the sum signal and the differential signal. Explain of the detail to measure the target angle is skipped because it is same as conventional methods.

Figure 4:
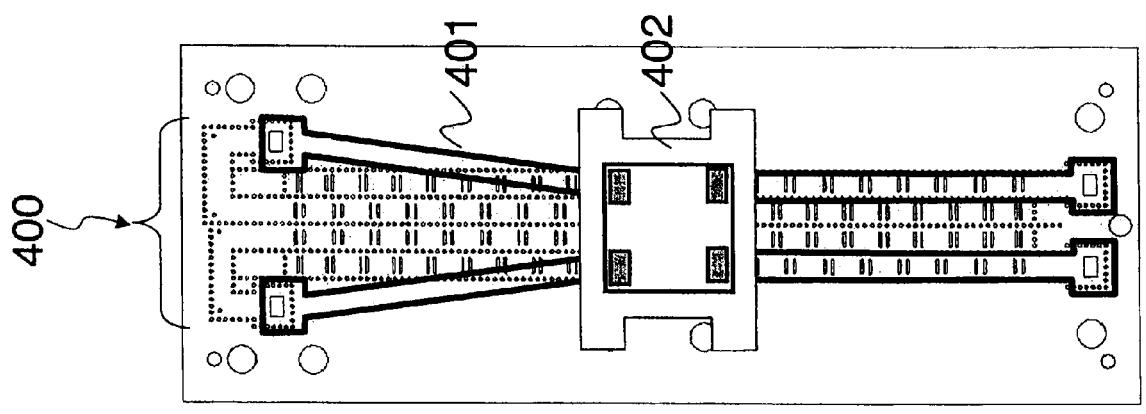
FIG. 4 is a top view of a prototype of the radar apparatus.

FIG. 4 shows a prototype 400 of the antenna device 100. The prototype 400 has four subarray antennas, four feeding lines 401, and a package 402. The package 402 includes the RF chip 302 and connecting to the A/D converter 303, and the DBF circuit 304. The prototype 400 adopts post-wall waveguide slotted subarray antennas as the subarray antennas. The detail of the post-wall waveguide slotted subarray antenna will be explained later. The subarray antennas are connected to the package 402 through the feeding lines 401, respectively. Each subarray antenna receives a signal and inputs the signal into the package 402 through the feeding line 401. Even if a phase of the RF signal in the feeding line 401 is shifted by manufacturing tolerance, the phase shift for each feeding line appears symmetry because the prototype 400 has the symmetrical structure with the central axis. Therefore, the phase shifts of each feeding line are canceled out each other, when these four signals through the feeding line 401 are combined in the package 402. As a result, the prototype 400 keeps forming a main beam (or a null) without tilt.

As described above, since the antenna device 100 has the inter-digital structure, it can achieve a small aperture area without giving interferences each other among the subarray antennas 101. Moreover, since the antenna device 100 also has the symmetrical structure, the phase shifts of the signals due to manufacturing tolerance are canceled out each other among the subarray antennas 101. Moreover, since the antenna device 100 includes the phase shifters 105, the phases of signals current in the feeding lines 103 can be co-phase, even though signals input from the feeding interfaces 104 have different phases. Therefore, the measurement accuracy of the target angle does not degrade in the antenna device 100.

MODIFIED EXAMPLE 1

Figure 5:
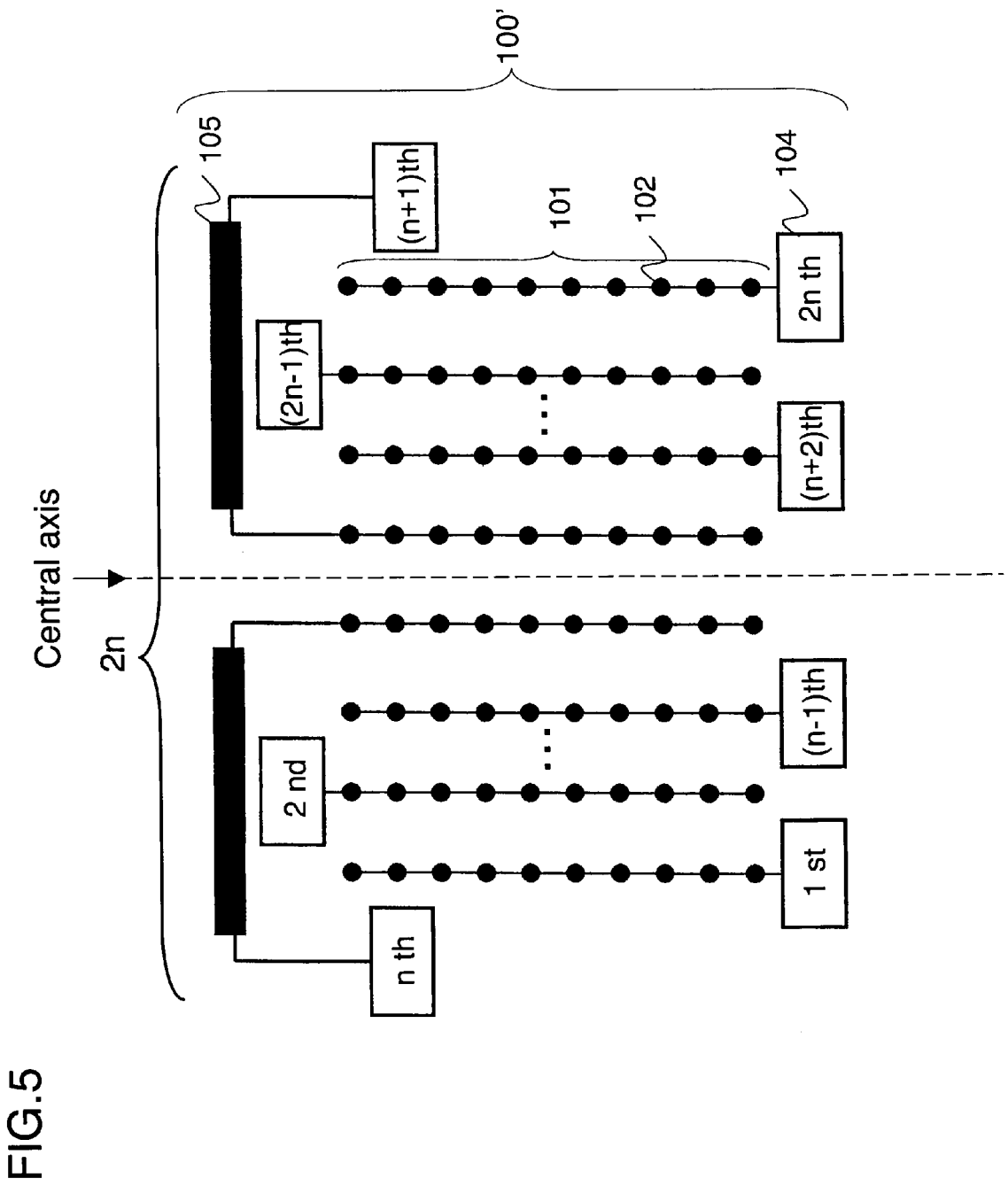
FIG. 5 is a top view of an antenna device.

Hereinafter, a modified example of an antenna device 100' will be described. FIG. 5 shows the antenna device 100' which the number of the subarray antennas is even. The antenna device 100' includes the subarray antennas 101, the feeding interfaces 104 and phase shifters 105 as same as the antenna device 100. While the n th and (n+1) th feeding interfaces 104, which are the closest to the central axis, are shifted away from each other to avoid giving interference in the antenna device 100 of FIG. 1, they are located at both outside of the 1 st and 2n th subarray antennas in the antenna device 100' of FIG. 5. The n th and (n+1) th feeding lines 103 are extended longer than other feeding lines 103. In the antenna device 101', the n th and (n+1) th feeding lines 103 have bend structures to connect to the n th and (n+1) th feeding interfaces 104, respectively.

The phase shifters 105 varies the widths of the n th and (n+1) th feeding lines 103 in order to shift the phases of the signals current in the feeding lines 103. The phase shifters 105 may vary the lengths of the n th and (n+1) th feeding lines 103.

Figure 6:
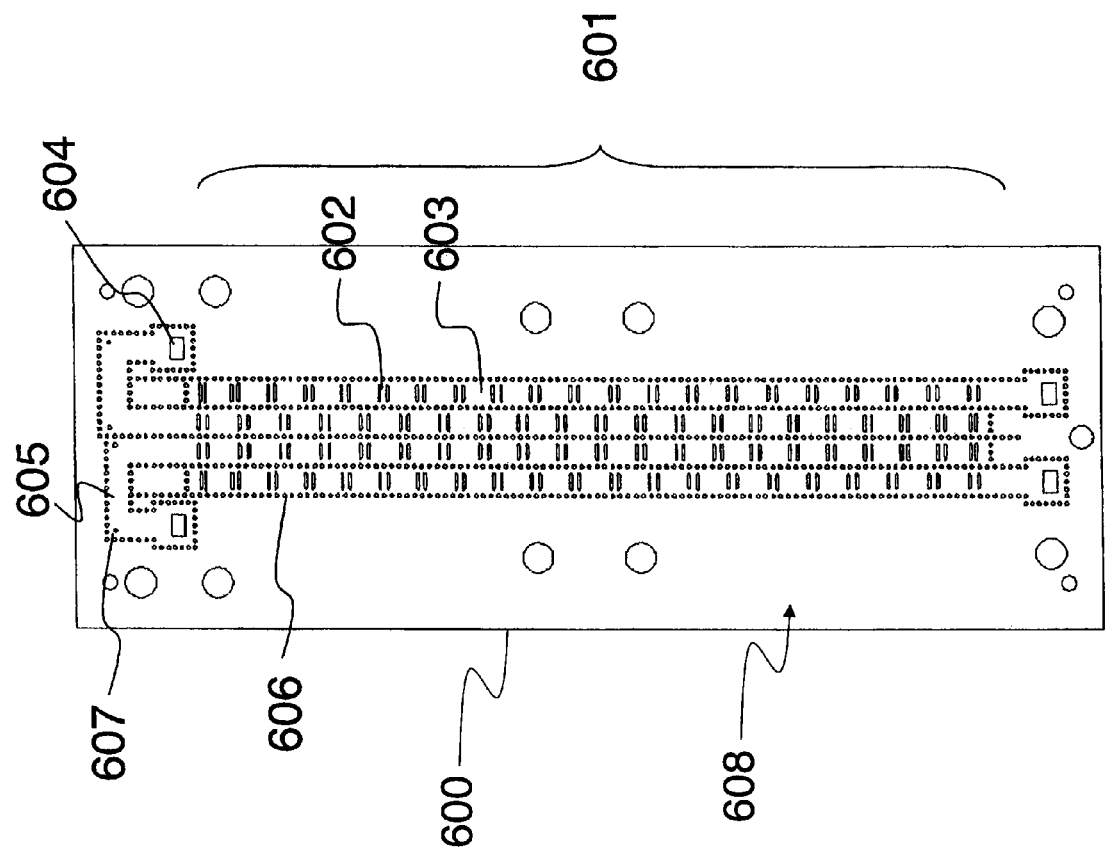
FIG. 6 is a top view of a prototype of the antenna device.

FIG. 6 shows a prototype 600 of the antenna device 100'. The prototype 600 is same as the prototype 400, except that the feeding lines 401 and the package 402 are not shown. The prototype 600 includes a dielectric substrate 608, four subarray antennas 601, four feeding interfaces 604, and two phase shifters 605. The dielectric substrate 608 has a layer which is made of a material such as liquid crystal polymer (LCP) or Polytetrafluoroethylene (PTFE). Both top and under surfaces of the layer are covered by membranes of conductive metal.

The prototype 600 adopts the post-wall waveguide slotted subarray antennas as the subarray antennas 601. The subarray antenna 601 includes antenna elements 602 and feeding lines 603.

The feeding lines 603 and the phase shifters 605 include through hole vias 606 and matching pins 607. The through hole via 606 is a via hole through the dielectric substrate 608. The via hole is filled with metal to connect electrically between the top and under surfaces. Many through hole vias 606 align in order to form a post-wall waveguide. The post-walls corresponds to a waveguide wall. The antenna element 602 is a slot which is formed by etching the top surface. In FIG. 6, the antenna element 602 is formed transverse to the aligned through hole vias 601. The antenna element 602 may be formed longitudinal or 45-degree to the aligned through hole vias 606. Moreover, the antenna elements 602 align at regular or unequally intervals in this embodiment.

The feeding interface 604 is an aperture which is formed by etching the top surface. Each feeding interface 604 is surrounded by many through hole vias 606. The matching pin 607 provides matching impedance between subarray antennas 601 and the feeding lines 401 (not shown). The matching pin 607 may be the through hole via 606. The feeding lines 603 are bent to be connected to the feeding interfaces 604, respectively. In FIG. 6, the feeding lines 603 are bent with L-shaped. The feeding lines 603 may be bent with U-shaped. Since the feeding lines 603 are bent to outside of the subarray antennas 601, respectively, the feeding interfaces 604 do not give interferences each other.

The phase shifters 605 varies the widths of the feeding lines 603 in order to shift the phases of the signals current in the feeding lines 603. The phase shifters 605 may vary the lengths of the feeding lines 603.

According to the modified example 1, the antenna device 100' keeps the symmetrical structure without giving interference each other among the feeding interfaces 104.

MODIFIED EXAMPLE 2

Hereinafter, another modified example will be described. In the modified example 2, the subarray antenna 101 is any one of a waveguide slotted subarray antenna, a conductive waveguide slotted subarray antenna, a patch antenna with the triplate line, a patch antenna with the microstrip line, and a horn array antenna. In the modified example 2, we will describe variation of alignments of the antenna elements 102.

Figure 7:
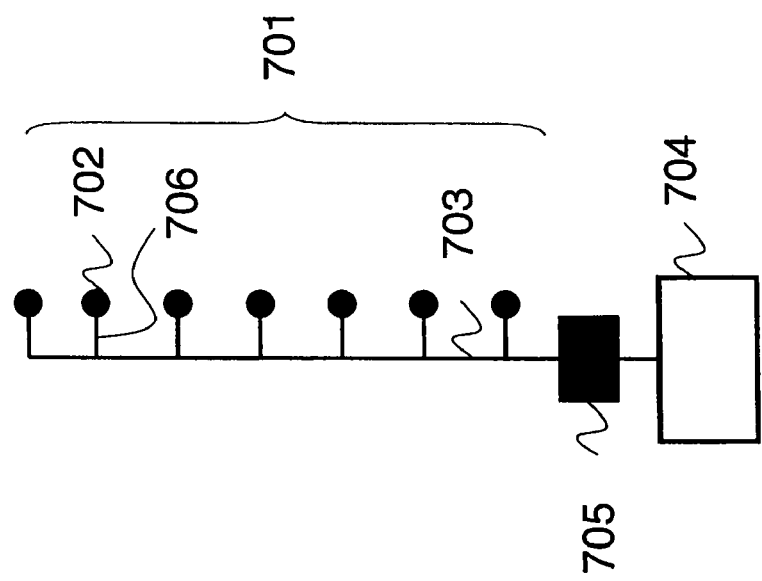
FIG. 7 is a top view of a subarray antenna with an alignment of the antenna elements.
Figure 8:
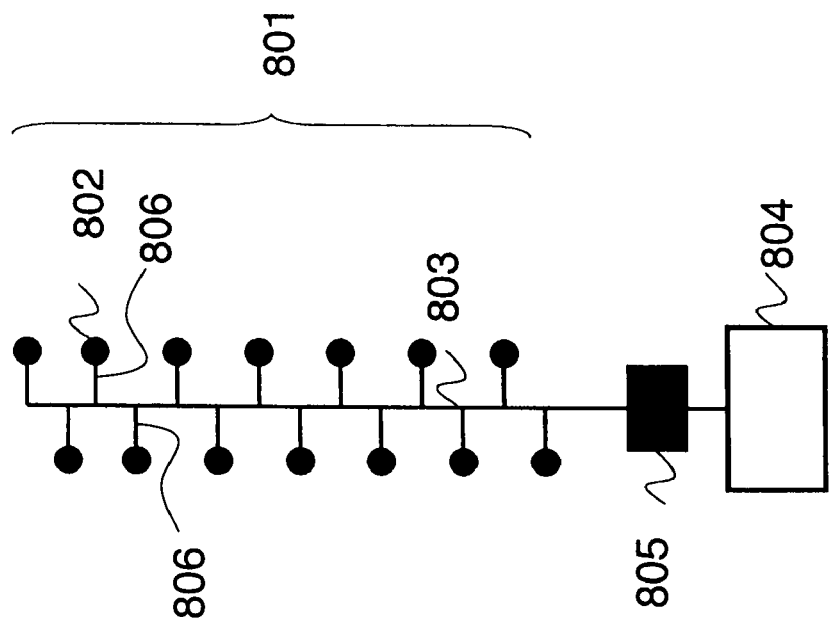
FIG. 8 is a top view of a subarray antenna with another alignment of the antenna elements.
Figure 9:
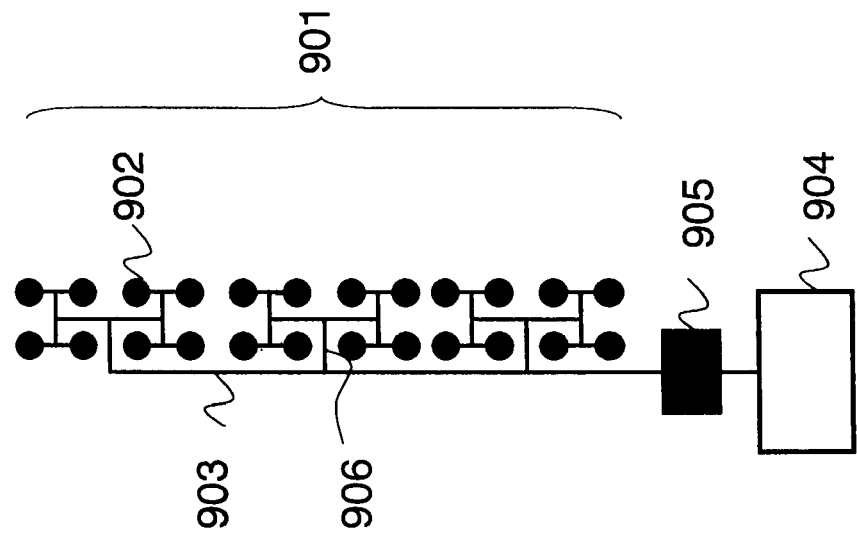
FIG. 9 is a top view of a subarray antenna with another alignment of the antenna elements.

FIGS. 7-9 show subarray antennas 701-901 which have different alignments of the antenna elements 702-902. As shown in FIG. 7, each antenna element 702 may be located at an end of a sub feeding line 706 which is branched to one side from the feeding line 703. As shown in FIG. 8, each antenna element 802 may be located at the end of a sub feeding line 806 which is branched to both sides from the feeding line 803. Moreover, as shown in FIG. 9, the antenna elements 902 may be located at the end of a sub feeding line 906 branching T-shaped three times from the feeding lines 903. One branch from the feeding lines 903 has eight antenna elements 902.

Figure 10:
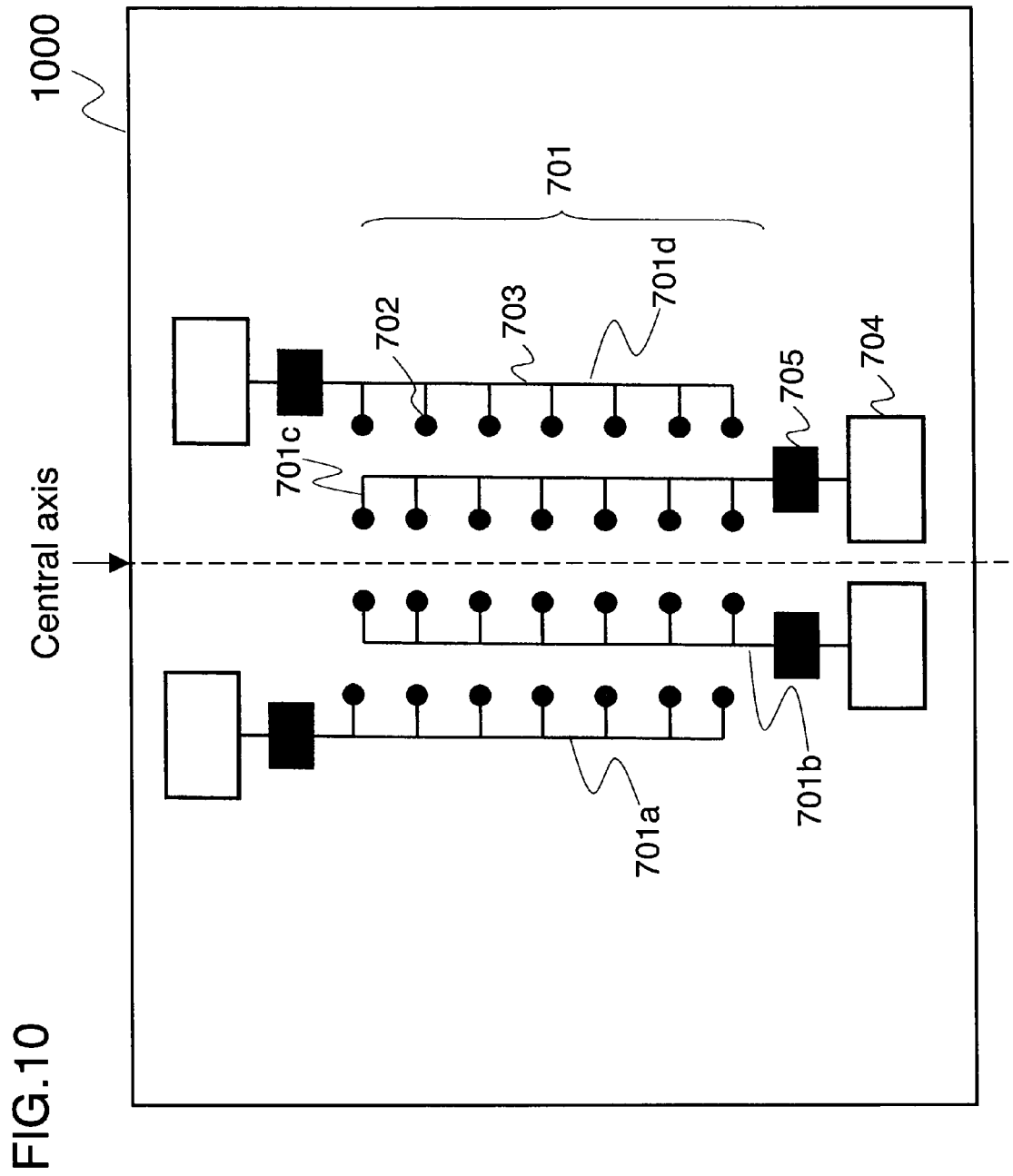
FIG. 10 is a top view of an antenna device.

FIG. 10 shows an antenna device 1000 using the subarray antennas 701. Each subarray antenna 701a-701d does not have the symmetrical structure. However, the antenna device 1000 has the symmetrical structure by arranging the subarray antennas 701a, 701b pointing to the right and the subarray antennas 701c, 701d pointing to the left. Similarly, the subarray antennas 801 and 901 can realize the antenna device which has the symmetrical structure.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An antenna device comprising:
   subarray antennas arranged parallel to each other with an interval on a plane, each subarray antenna including antenna elements and feeding lines, the feeding lines feeding signals to the antenna elements; and
   feeding interfaces, each being connected to each of the subarray antennas, wherein
   at least one of the feeding lines includes a phase shifter which shifts phases of the signals feeding to corresponding antenna elements,
   the interval of the subarray antennas is less or equal than a free-space wavelength,
   the subarray antennas are symmetrically arranged about a central axis on the plane,
   the central axis being along with the center of two adjacent subarray antennas arranged at middle of the subarray antennas when the number of the subarray antennas is even, and being along with one subarray antenna arranged at the middle of the subarray antennas when the number of the subarray antennas is odd.

2. The antenna device of claim 1, wherein
   the phase shifter shifts phases of the signals current in the feeding line to be co-phase.

3. The antenna device of claim 1, wherein
   the phase shifter shifts phases of the signals current in the feeding line by 180 degree to be co-phase for signals of the subarray antennas in both sides of the central axis.

4. The antenna device of claim 1, wherein
   the phase shifter is a line of which width is different from the feeding line.

5. The antenna device of claim 1, wherein
   length of the phase shifter in one side of the central axis is different from that in other side of the central axis.

6. The antenna device of claim 1, wherein
   the phase shifter is inserted in between the feeding interface and the antenna element which is closest to the feeding interface in the subarray antenna.

7. The antenna device of claim 1, wherein
   when the number of the subarray antennas is even, two feeding interfaces, which are connected to the subarray antennas which are located the closest to the central axis, are connected to the closest antenna elements with longer distance compared with other feeding interfaces.

8. The antenna device of claim 1, wherein
   when the number of the subarray antennas is even, two feeding interfaces, which are connected to the subarray antennas which are located in both side of the central axis respectively and the closest to the central axis, are located at further positions from the central axis compared with other feeding interfaces.

9. The antenna device of claim 1, wherein
   when the number of the subarray antennas is even and the feeding interfaces are divided into two groups with the central axis, the feeding interfaces are located at a furthest end of the subarray antenna from the feeding interface of the adjacent subarray antenna in each groups, respectively.

10. An antenna device comprising:
    subarray antennas, each subarray antenna including antenna elements and feeding lines, being arranged along an alignment of the antenna elements parallel to each other with an interval on a plane, the feeding lines feeding signals to the antenna elements; and
    feeding interfaces, each being connected to each of the subarray antennas, being divided into two groups with the central axis, each being located at a furthest end of the subarray antenna from the feeding interface of the adjacent subarray antenna in each groups,
    wherein
    at least one of the feeding lines includes a phase shifter which shifts phases of the signals feeding to corresponding antenna elements,
    the interval of the subarray antennas is less or equal than a free-space wavelength,
    the subarray antennas are symmetrically arranged about a central axis on the plane,
    the central axis being along with the center of two adjacent subarray antennas arranged at middle of the subarray antennas when the number of the subarray antennas is even, and being along with one subarray antenna arranged at the middle of the subarray antennas when the number of the subarray antennas is odd.

11. The antenna device of claim 10, wherein
    the phase shifter shifts phases of the signals current in the feeding line to be co-phase.

12. The antenna device of claim 10, wherein
    the phase shifter shifts phases of the signals current in the feeding line by 180 degree to be co-phase for signals of the subarray antennas in both sides of the central axis.

13. The antenna device of claim 10, wherein
    the phase shifter is a line of which width is different from the feeding line.

14. The antenna device of claim 10, wherein
    length of the phase shifter in one side of the central axis is different from that in other side of the central axis.

15. The antenna device of claim 10, wherein
    the phase shifter is inserted in between the feeding interface and the antenna element which is closest to the feeding interface in the subarray antenna.

16. The antenna device of claim 10, wherein
    when the number of the subarray antennas is even, two feeding interfaces, which are connected to the subarray antennas which are located the closest to the central axis, are connected to the closest antenna elements with longer distance compared with other feeding interfaces.

17. The antenna device of claim 1, wherein
    when the number of the subarray antennas is even, two feeding interfaces, which are connected to the subarray antennas which are located in both side of the central axis respectively and the closest to the central axis, are located at positions where the connection point of the feeding interface and the subarray antenna is shifted to the central axis from the middle of width of the feeding interface.

18. The antenna device of claim 1, wherein
    the subarray antennas is any one of a post-wall waveguide slotted array antenna, a dielectric waveguide slotted array antenna, a waveguide slotted array antenna, a patch antenna with a microstrip line, a patch antenna with a triplate line, and a horn array antenna.

19. A radar apparatus comprising:
    the antenna device of claim 1, which receives a first signal;
    an RF chip amplifying the first signal and down-converting a frequency of the first signal to a lower frequency to obtain a second signal;
    an A/D converter converting the second signal to a digital signal;
    a DBF circuit measuring a target angle based on the digital signal.

* * * * *